(12) United States Patent
Hwang et al.

(10) Patent No.: US 12,437,892 B2
(45) Date of Patent: Oct. 7, 2025

(54) DISMANTLING AND DECONTAMINATION SYSTEM AND METHOD OF BIOPROTECTIVE CONCRETE OF PWR TYPE NUCLEAR POWER PLANT

(71) Applicant: KOREA HYDRO & NUCLEAR POWER CO., LTD., Gyeongju-si (KR)

(72) Inventors: Seok-Ju Hwang, Daejeon (KR); Mi-Hyun Lee, Daejeon (KR); Sung-Hoon Hong, Daegu (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 1200 days.

(21) Appl. No.: 17/048,222

(22) PCT Filed: Apr. 17, 2019

(86) PCT No.: PCT/KR2019/004660
§ 371 (c)(1),
(2) Date: Oct. 16, 2020

(87) PCT Pub. No.: WO2019/203577
PCT Pub. Date: Oct. 24, 2019

(65) Prior Publication Data
US 2021/0174978 A1   Jun. 10, 2021

(30) Foreign Application Priority Data
Apr. 17, 2018  (KR) .................. 10-2018-0044584

(51) Int. Cl.
*G21D 1/00* (2006.01)
*G21F 9/00* (2006.01)
*G21F 9/30* (2006.01)

(52) U.S. Cl.
CPC ............ *G21D 1/003* (2013.01); *G21F 9/001* (2013.01); *G21F 9/30* (2013.01)

(58) Field of Classification Search
CPC ........ G21C 19/32; G21D 1/003; G21F 9/304; G21F 9/34
(Continued)

(56) References Cited

U.S. PATENT DOCUMENTS 2,935,616 A * 5/1960 Smith, Jr. ............... G21F 5/005
                                                    250/506.1
4,969,311 A * 11/1990 Nutter ....................... G21F 5/00
                                                    134/25.4
(Continued)

FOREIGN PATENT DOCUMENTS

EP   0308213 A2 *   3/1989
FR   2553561 A  *   4/1985   ............. B08B 15/04
(Continued)

OTHER PUBLICATIONS

EPO, Search Report of EP 19787623.8 dated Dec. 15, 2021.

*Primary Examiner* — Jinney Kil
(74) *Attorney, Agent, or Firm* — LEX IP MEISTER, PLLC

(57) ABSTRACT

A dismantling and decontamination system of biodegradable concrete of a nuclear power plant according to an exemplary embodiment includes: a dismantling device for dismantling an in-core instrument installed under biodegradable concrete to form a lower penetrated part of the biodegradable concrete; a decontamination device inserted inside the biodegradable concrete for decontaminating radioactive waste of the inner wall of the biodegradable concrete; a waste receiving device movable through the lower penetrated part of the biodegradable concrete; and a blocking device for blocking
(Continued)

the upper opening of the biodegradable concrete to block an outflow of the radioactive dust.

5 Claims, 4 Drawing Sheets

(58) Field of Classification Search
USPC .............................. 376/272; 83/930; 588/1, 3
See application file for complete search history.

(56) References Cited

U.S. PATENT DOCUMENTS

| | | | | |
|---|---|---|---|---|
| 5,001,870 | A | * | 3/1991 | Yokota .................... B24C 1/045 |
| | | | | 451/92 |
| 2011/0235768 | A1 | * | 9/2011 | Heim ..................... G21D 1/003 |
| | | | | 976/DIG. 293 |
| 2015/0034531 | A1 | * | 2/2015 | Starke ....................... G21F 9/30 |
| | | | | 209/3.1 |

FOREIGN PATENT DOCUMENTS

| | | |
|---|---|---|
| JP | 59-023298 | 2/1984 |
| JP | 04-158297 | 6/1992 |
| JP | 08-075892 | 3/1996 |
| JP | 08-240693 | 9/1996 |
| JP | 2857805 | 2/1999 |
| JP | 2016-161495 | 9/2016 |
| KR | 2002-0011485 | 2/2002 |
| KR | 10-2011-0118726 | 10/2011 |
| WO | 2010-094692 | 8/2010 |

\* cited by examiner

DISMANTLING AND DECONTAMINATION SYSTEM AND METHOD OF BIOPROTECTIVE CONCRETE OF PWR TYPE NUCLEAR POWER PLANT

TECHNICAL FIELD

The present disclosure relates to a dismantling and decontamination system and method of bioprotective concrete of a nuclear power plant. More particularly, the present invention relates to a dismantling and decontamination system and method of bioprotective concrete of a PWR type of nuclear power plant.

BACKGROUND ART

As fossil energy is depleted worldwide, nuclear power generation is being used as a major energy source. In such nuclear power generation, a generally-used pressurized water reactor (PWR) nuclear power plant consists of a primary system circulating in a nuclear reactor, a secondary system circulating in a steam generator, and a tertiary system circulating in a condenser. Specifically, in the primary system, a pressure is applied to a coolant contained in a reactor to maintain 150 atm and 300° C., and in the secondary system, the coolant boils water on the side of the steam generator while passing through the steam generator to generate steam to turn a turbine. In the tertiary system, the steam generated for turning the turbine passes through a condenser, becomes water again, and is sent to the steam generator.

The nuclear reactor of such a PWR type of nuclear power plant includes an external pressure vessel, and a nuclear reactor vessel composed of a core barrel that is formed with a smaller diameter than that of the pressure vessel and installed at the center of the pressure vessel. Inside the core barrel, the core into which a nuclear fuel rod is loaded is positioned, and a precipitation unit, which is a space of a ring shape due to the difference in diameter, is formed between the core barrel and the pressure vessel. In addition, a plurality of low temperature tubes that are connected to the pressure vessel and become circulation passages of cooling water, and a high temperature tube (hot leg) connected to the core barrel so that the cooling water heated while inflowing through the low temperature tubes and passing through the precipitation unit and the core flows toward the steam generator, are included.

In this PWR type of nuclear power plant, bioprotective concrete is installed as a reinforced concrete structure to protect against radiation exposure of workers by supporting the nuclear reactor and shielding neutrons.

The bioprotective concrete forms a large cylindrical reinforced concrete structure by stacking a plurality of layers and is highly radioactive by irradiation of neutrons, so if workers work in close proximity thereto, there is a risk of radiation exposure. Particularly, since the inner wall of the bioprotective concrete is severely contaminated with a radioactive material, when dismantling a pressurized light water reactor (PWR) type of nuclear power plant that has expired and is permanently stopped, a decontamination process of the inner wall of the bioprotective concrete is required.

However, for the decontamination process, if a worker forms a separate through-hole for inserting the decontamination device into the bioprotective concrete, there is a concern of radioactive exposure and movement of radioactive dust.

DISCLOSURE

Technical Problem

The present exemplary embodiment relates to a dismantling and decontamination system and method of bioprotective concrete of a nuclear power plant that may shorten the dismantling process time and a worker exposure.

Technical Solution

A dismantling and decontamination system of bioprotective concrete of a nuclear power plant according to an exemplary embodiment includes: a dismantling device for dismantling an in-core instrument installed under bioprotective concrete to form a lower penetrated part of the bioprotective concrete; a decontamination device inserted inside the bioprotective concrete for decontaminating radioactive waste of the inner wall of the bioprotective concrete; a waste receiving device movable through the lower penetrated part of the bioprotective concrete; and a blocking device for blocking the upper opening of the bioprotective concrete to block an outflow of the radioactive dust.

A dust collecting device connected to the dust blocking device and collecting the radioactive dust may be further included.

The waste receiving device may include: a receiving unit receiving radioactive waste; a receiving unit size adjusting unit for adjusting the size of the receiving unit; and a moving unit for moving the receiving unit.

In the lower penetrated part, the size of the receiving unit may be smaller than the diameter of the lower penetrated part, and in the bioprotective concrete, the size of the receiving unit may be smaller than the interior diameter of the bioprotective concrete.

The lower penetrated part of the bioprotective concrete may be connected to the interior of the bioprotective concrete.

The decontamination device may include an inner wall hammer or a scabbler.

The dust blocking device may include a tent or a shield.

A decontamination and dismantling method of bioprotective concrete of a nuclear power plant according to an exemplary embodiment includes: dismantling an in-core instrument installed under the bioprotective concrete by using a dismantling device to form a lower penetrated part of the bioprotective concrete; inserting a decontamination device inside the bioprotective concrete to decontaminate radioactive waste of the inner wall of the bioprotective concrete; and inserting the waste receiving device through the lower penetrated part of the bioprotective concrete inside the bioprotective concrete.

Blocking the upper opening of the bioprotective concrete by using a dust blocking device to block outflow of the radioactive dust may be further included.

Collecting the radioactive dust by using a dust collecting device connected to the dust blocking device may be further included.

The lower penetrated part of the bioprotective concrete may be connected to the interior of the bioprotective concrete.

Dismantling a nuclear reactor installed inside the bioprotective concrete before decontaminating the radioactive waste of the inner wall of the bioprotective concrete may be further included.

Advantageous Effects

According to an exemplary embodiment, during the decontamination and dismantling process of the bioprotective concrete of the nuclear power plant, the dismantling process time may be shortened by frequently inputting and drawing out the radioactive waste by using the lower penetrated part of the bioprotective concrete where the dismantled in-core instrument was disposed without taking out the radioactive waste to the upper opening of the bioprotective concrete, thereby efficiently carrying out the decontamination and dismantling process of the bioprotective concrete inner wall.

In addition, since the decontamination process of the bioprotective concrete inner wall is performed using the lower penetrated part of the bioprotective concrete, the exposure of workers to the radioactive dust may be reduced by maintaining the sealing of the upper part of the bioprotective concrete.

MODE FOR INVENTION

Figure 1:
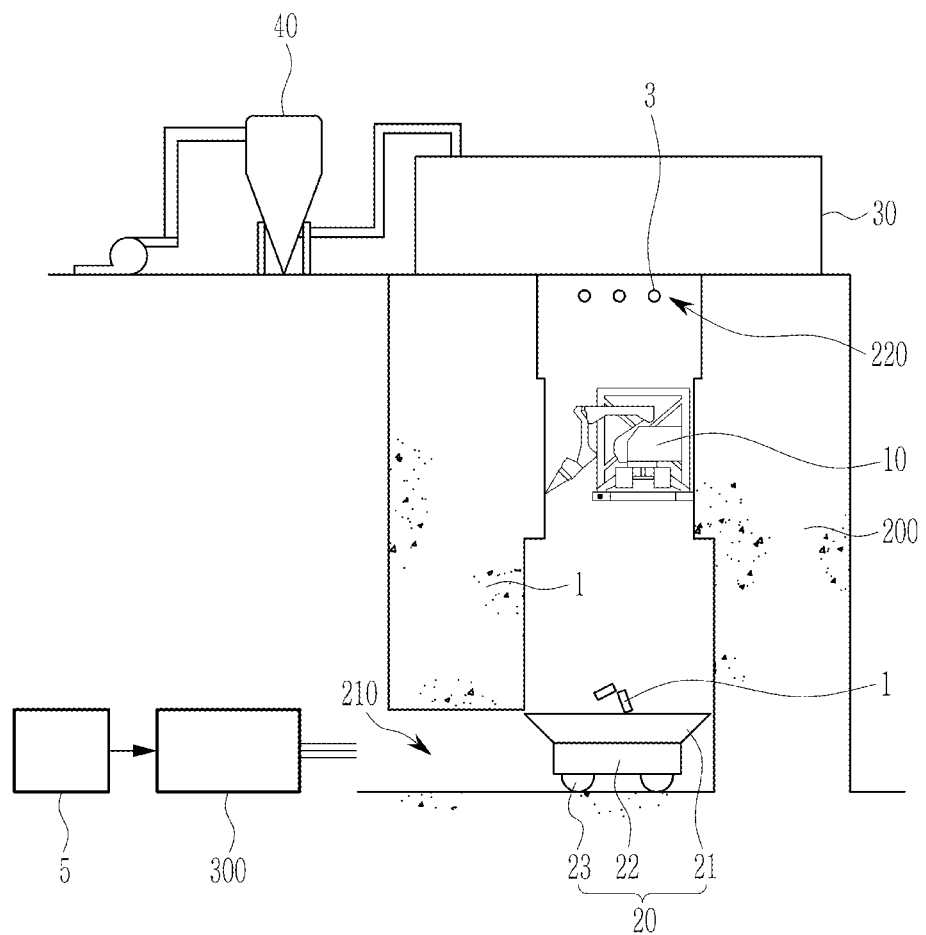
FIG. 1 is a schematic diagram of a dismantling and decontamination system of bioprotective concrete of a nuclear power plant according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, portions that are not directly related to the present invention are omitted, and the same reference numerals are attached to the same or similar constituent elements through the entire specification.

In addition, the size and thickness of each configuration shown in the drawings are arbitrarily shown for better understanding and ease of description, but the present invention is not limited thereto.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise", and variations such as "comprises" or "comprising", will be understood to imply the inclusion of stated elements but not the exclusion of any other elements. Further, in the specification, the word "on" means positioning on or below the object portion, but does not essentially mean positioning on the upper side of the object portion based on a gravity direction.

FIG. 1 is a schematic diagram of a dismantling and decontamination system of bioprotective concrete of a nuclear power plant according to an exemplary embodiment.

As shown in FIG. 1, a dismantling and decontamination system of bioprotective concrete of a nuclear power plant according to an exemplary embodiment includes a dismantling device 5 dismantling an in-core instrument (ICI) 300 installed under bioprotective concrete 200, a decontamination device 10 decontaminating radioactive waste 1 of the inner wall of the bioprotective concrete 200, a waste receiving device 20 receiving the radioactive waste 1 decontaminated by the decontamination device 10, a dust blocking device 30 blocking radioactive dust 3 generated during the decontamination of the radioactive waste 1, and a dust collecting device 40 collecting the radioactive dust 3.

The dismantling device 5 forms a lower penetrated part 210 under the bioprotective concrete 200 by dismantling the in-core instrument 300 installed from the lower part of the bioprotective concrete 200 to the inside of a nuclear reactor 100. The lower penetrated part 210 of the bioprotective concrete 200 is the space where the in-core instrument (ICI) 300 of the bioprotective concrete 200 was positioned. The in-core instrument 300 is a device to measure an output distribution and combustibility of a nuclear fuel inside the nuclear reactor and to measure an outlet temperature of the core of the nuclear reactor 100 by detecting neutrons generated during the nuclear fission reaction process of the nuclear reactor 100.

The decontamination device 10 is put into the inside of the bioprotective concrete 200. The decontamination device 10 may include an inner wall hammer or a scabbler. The inner wall hammer hits the inner wall of the bioprotective concrete 200 to remove the radioactive waste 1 from the inner wall of the bioprotective concrete 200. Further, the scabbler scrapes the inner wall of the bioprotective concrete 200 to remove the radioactive waste 1 from the inner wall of the bioprotective concrete 200. In the present exemplary embodiment, the inner wall hammer or the scabbler has been described as an example of the decontamination device, but it is not limited thereto, and various devices are possible as long as it is a device for removing the radioactive waste 1 from the inner wall of the bioprotective concrete 200.

The waste receiving device 20 may include a receiving unit 21 for receiving the radioactive waste 1, a receiving unit size adjusting unit 22 for adjusting the size of the receiving unit 21 and a moving unit 23 for moving the receiving unit 21.

Figure 2:
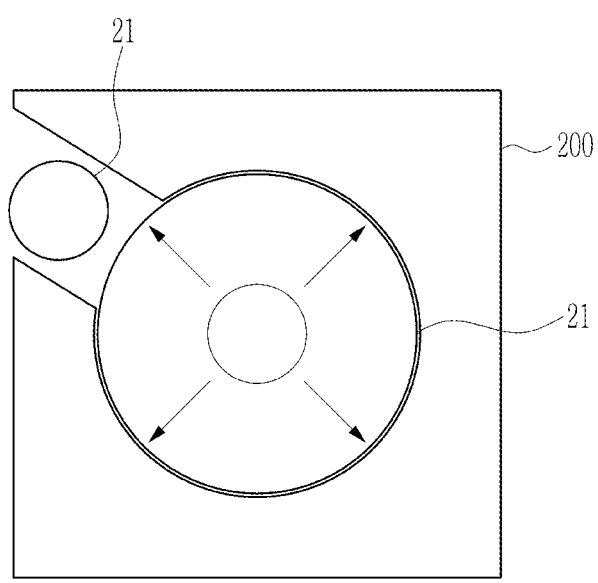
FIG. 2 is a top plan view showing a state in which a size of a receiving unit of a waste receiving device of FIG. 1 is changed inside bioprotective concrete.

As shown in FIG. 2, the size of the receiving unit 21 is adjustable. When passing through the lower penetrated part 210, the size of the receiving unit 21 may be smaller than the diameter of the lower penetrated part 210 so that the receiving unit 21 may easily pass through the lower penetrated part 210. Further, when being disposed inside the bioprotective concrete 200, the size of the receiving unit 21 is expanded so that the receiving unit 21 may receive most of the radioactive waste 1 and may be smaller than the interior diameter of the bioprotective concrete 200.

This waste receiving device 20 is movable through the lower penetrated part 210 of the bioprotective concrete 200.

The lower penetrated part 210 of the bioprotective concrete 200 may be connected to the interior of the bioprotective concrete 200 where the decontamination device 10 is positioned. Thus, the waste receiving device 20 may be disposed under the decontamination device 10. Therefore, the waste receiving device 20 may easily accommodate the radioactive waste 1 separated from the inner wall of the bioprotective concrete 200 by the decontamination device 10.

As described above, when the decontamination process of the bioprotective concrete 200 of the nuclear power plant is in progress, the waste receiving device 20 may be easily inserted and taken out from time to time by using the lower penetrated part 210 of the bioprotective concrete 200 without the need to take out the radioactive waste 1 of the inner wall of the bioprotective concrete 200 to an upper opening 220. Therefore, it is possible to shorten the decontamination process time of the inner wall of the bioprotective concrete 200.

The dust blocking device 30 may block the upper opening 220 of the bioprotective concrete 200 to block the outflow of the radioactive dust 3. The dust blocking device 30 may include a tent or a shield. In the present exemplary embodiment, the tent or shield has been described as an example of the dust blocking device 30, but it is not limited thereto, and various devices for blocking the radioactive dust are possible. In addition, the dust blocking device 30 may further include a blocking adjusting unit for blocking or opening the upper opening 220 of the bioprotective concrete 200.

In this way, when the decontamination and dismantling process of the inner wall of the bioprotective concrete 200 is performed using the lower penetrated part 210 of the bioprotective concrete 200, the upper opening 220 of the bioprotective concrete 200 is kept sealed by using the dust blocking device 30, thereby reducing worker exposure to the radioactive dust 3 and preventing the spread of the radioactive dust.

The dust collecting device 40 is connected to the dust blocking device 30 and is disposed outside the bioprotective concrete 200. It is possible to secure a view inside the work part through the dust collecting device 40 using an exhaust fan.

Meanwhile, the decontamination and dismantling method of the bioprotective concrete of the nuclear power plant according to an exemplary embodiment of the present invention is described in detail below with reference to drawings.

Figure 3:
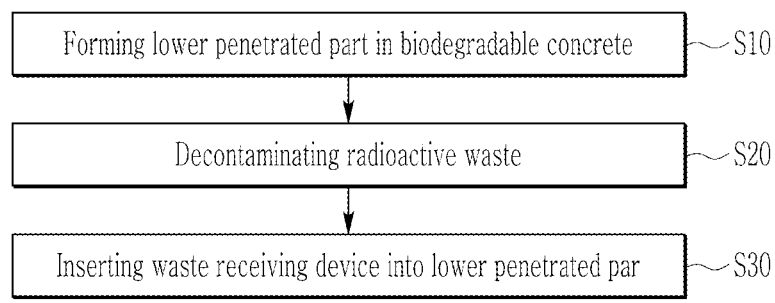
FIG. 3 is a flowchart of a decontamination and dismantling method of bioprotective concrete of a nuclear power plant according to an exemplary embodiment.

FIG. 2 is a top plan view showing a state in which a size of a receiving unit of a waste receiving device of FIG. 1 is changed inside bioprotective concrete, and FIG. 3 is a flowchart of a decontamination and dismantling method of bioprotective concrete of a nuclear power plant according to an exemplary embodiment.

Figure 4:
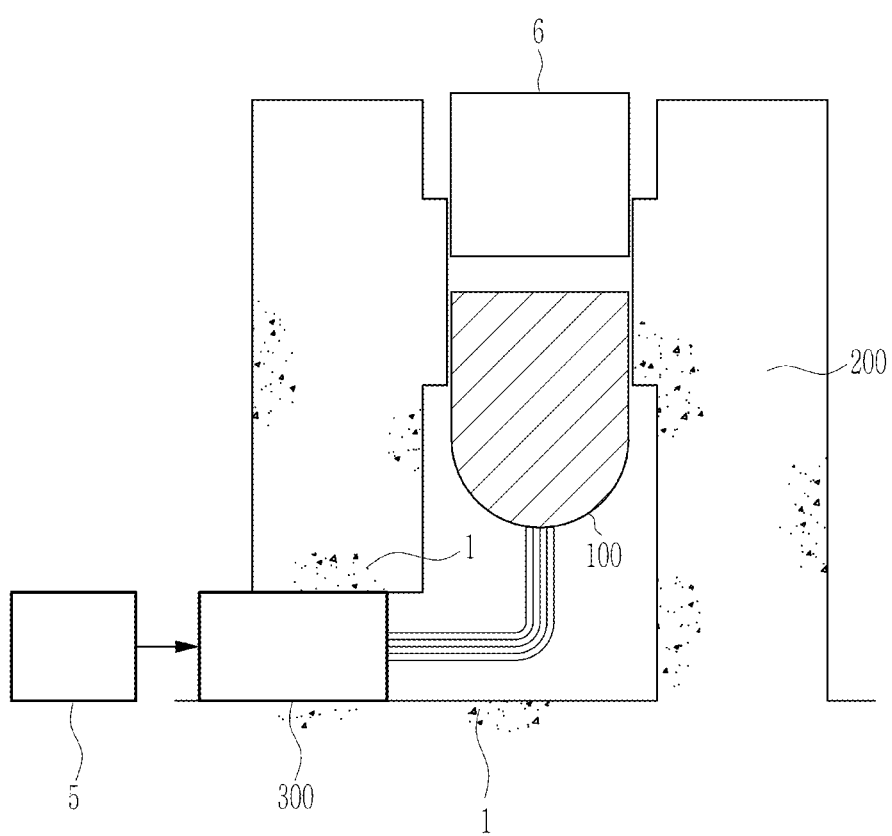
FIG. 4 is a view showing a step before dismantling bioprotective concrete of a nuclear power plant according to an exemplary embodiment.

As shown in FIG. 3 and FIG. 4, in the decontamination and dismantling method of the bioprotective concrete of the nuclear power plant according to an exemplary embodiment of the present invention, the in-core instrument 300 installed under the bioprotective concrete 200 is dismantled by using the dismantling device 5 to form the lower penetrated part 210 under the bioprotective concrete 200 (S10). Since the in-core instrument 300 is connected to the nuclear reactor 100 through a plurality of cables, etc., the cables may be separated from the nuclear reactor 100 to physically separate the in-core instrument 300 from the nuclear reactor 100.

At this time, the nuclear reactor 100 disposed inside the bioprotective concrete 200 is also dismantled by using a nuclear reactor dismantling device 6.

Next, as shown in FIG. 1 and FIG. 3, the decontamination device 10 is inserted inside the bioprotective concrete 200 to decontaminate the radioactive waste 1 of the inner wall of the bioprotective concrete 200 (S20). Further, the waste receiving device 20 is inserted into the interior of the bioprotective concrete 200 through the lower penetrated part 210 of the bioprotective concrete 200 (S30). At this time, the lower penetrated part 210 of the bioprotective concrete 200 may be connected to the interior of the bioprotective concrete 200. Thus, the waste receiving device 20 may be disposed under the decontamination device 10. Therefore, the waste receiving device 20 may easily accommodate the radioactive waste 1 of the inner wall of the bioprotective concrete 200 generated by the decontamination device 10.

In addition, as shown in FIG. 1, the upper opening 220 of the bioprotective concrete 200 is blocked using the dust blocking device 30 to block the outflow of the radioactive dust 3. At this time, the radioactive dust 3 may be collected using the dust collecting device 40 connected to the dust blocking device 30.

As described above, when the decontamination process of bioprotective concrete 200 of the nuclear power plant is in progress, since the waste receiving device 20 may be easily input and taken out from time to time by using the lower penetrated part 210 of the bioprotective concrete 200 without the need to carry out the radioactive waste 1 of the inner wall of the bioprotective concrete 200 to the upper opening 220 of the bioprotective concrete 200, the decontamination and dismantling process time of the inner wall of the bioprotective concrete 200 may be shortened.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A dismantling and decontamination system for dismantling and decontaminating bioprotective concrete of a nuclear power plant, comprising:

a dismantling device configured to dismantle an in-core instrument to form a penetrated part of the bioprotective concrete, wherein the in-core instrument is installed within the bioprotective concrete at a lower part of the bioprotective concrete, and wherein the penetrated part is formed in the lower part of the bioprotective concrete;

a decontamination device configured to be inserted inside of an interior space of the bioprotective concrete for decontaminating radioactive waste of an inner wall of the bioprotective concrete forming the interior space, wherein the decontamination device, in its entirety, is inserted inside of the interior space of the bioprotective concrete;

a waste receiving device configured to move into the interior space of the bioprotective concrete through the penetrated part of the bioprotective concrete; and a blocking device configured to contact an upper surface of the bioprotective concrete and block an upper opening of the interior space of the bioprotective concrete to block an outflow of radioactive dust.

2. The dismantling and decontamination system of the bioprotective concrete of the nuclear power plant of claim 1, wherein the waste receiving device includes:

a receiving unit receiving the radioactive waste; and a moving unit for moving the receiving unit.

3. The dismantling and decontamination system of the bioprotective concrete of the nuclear power plant of claim 2, wherein the area of the receiving unit is adjustable from a first area able to pass through the penetrated part to a second area greater than the first area and smaller than a cross-sectional area of the interior space of the bioprotective concrete.

4. The dismantling and decontamination system of the bioprotective concrete of the nuclear power plant of claim 1, wherein the decontamination device includes a hammer or a scabbler.

5. The dismantling and decontamination system of the bioprotective concrete of the nuclear power plant of claim 1, wherein the dust blocking device includes a tent or a shield.

\* \* \* \* \*